Aug. 6, 1929.    C. S. WEYANDT    1,723,830
METHOD OF AND MEANS FOR CONTROLLING RECIPROCATING MOTORS
Filed Feb. 15, 1924    2 Sheets-Sheet 1
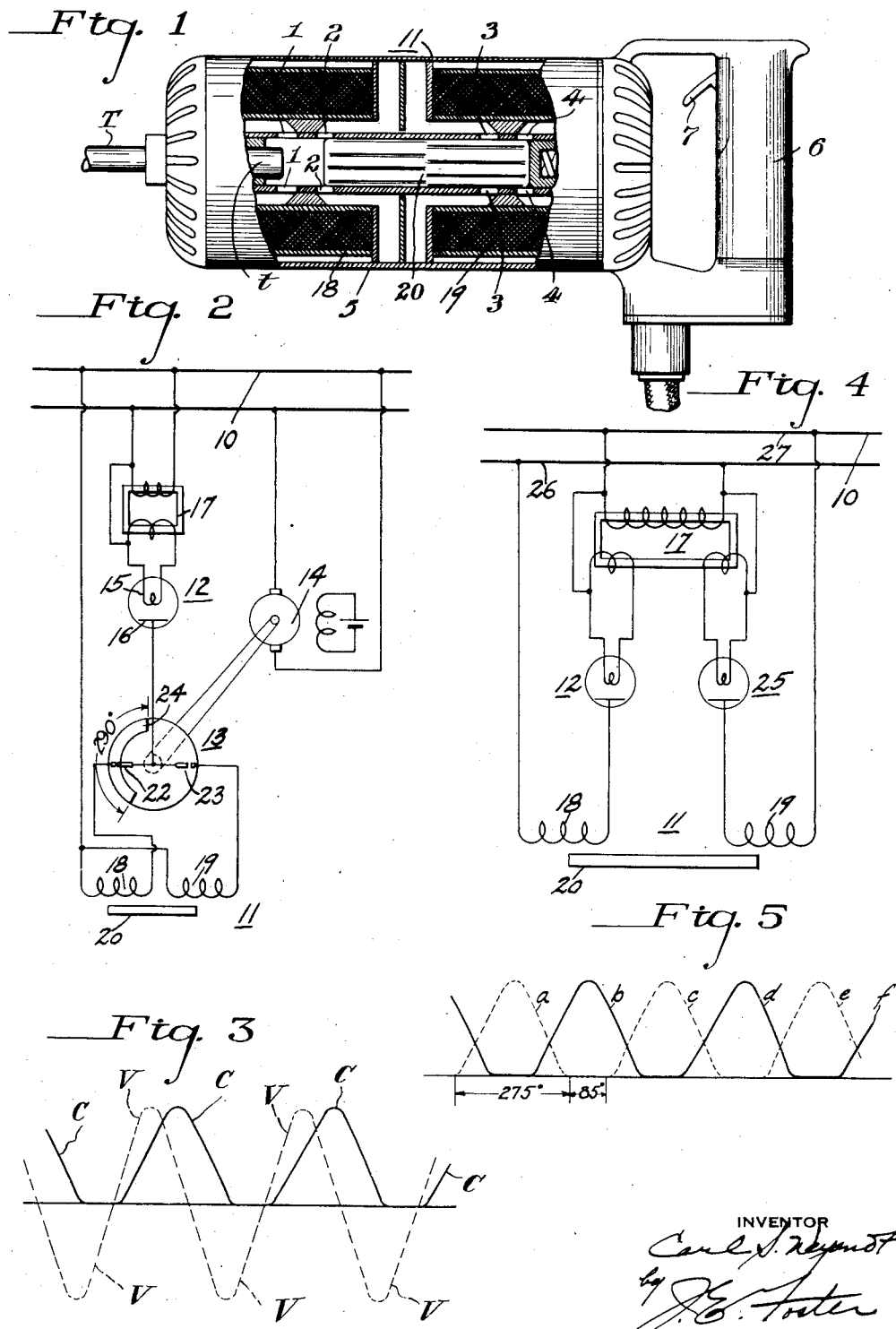

Aug. 6, 1929.  C. S. WEYANDT  1,723,830
METHOD OF AND MEANS FOR CONTROLLING RECIPROCATING MOTORS
Filed Feb. 15, 1924  2 Sheets-Sheet 2
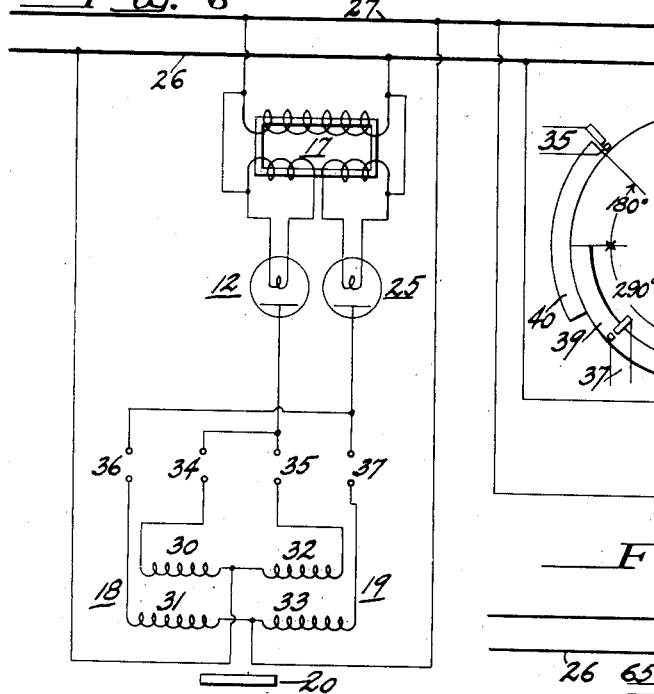
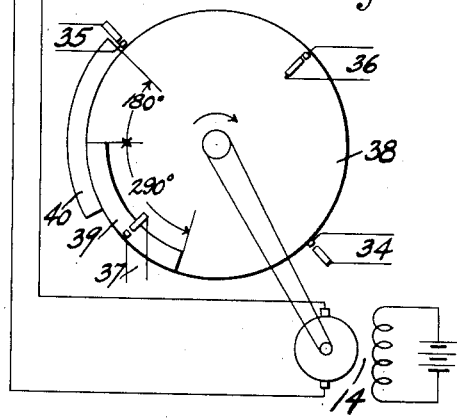
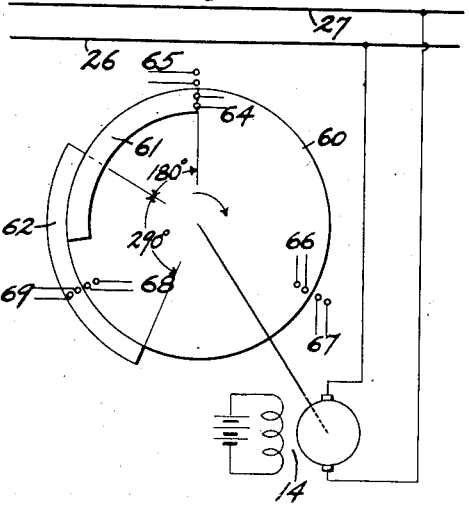
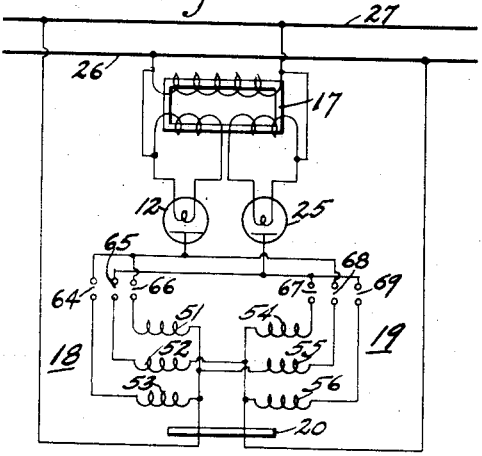
INVENTOR
Carl S. Weyandt
by ... 
his attorney Patented Aug. 6, 1929.

1,723,830

UNITED STATES PATENT OFFICE.

CARL S. WEYANDT, OF PITTSBURGH, PENNSYLVANIA, ASSIGNOR TO CENTRAL ELECTRIC TOOL COMPANY, A CORPORATION OF PENNSYLVANIA.

METHOD OF AND MEANS FOR CONTROLLING RECIPROCATING MOTORS.

Application filed February 15, 1924. Serial No. 693,013.

My invention relates to reciprocating motors and particularly to motors employed for percussive purposes to do useful work such as drilling or riveting.

One object of my invention is to provide a method of and means for controlling a reciprocating motor whereby it may be energized from an alternating current circuit, preferably single phase, and controlled to operate at a frequency lower than the normal speed compared to the frequency of the current.

Another object of my invention is to provide a system of control for a reciprocating motor whereby a relatively powerful working stroke of long duration may be obtained.

Another object of my invention is to control a translating device, particularly a reciprocating motor, by admitting thereto energizing trains of predetermined numbers of waves of one polarity.

Another object of my invention is to provide a method of and apparatus for operating a reciprocating motor from an alternating current source, wherein a plurality of dephased uni-directional current impulses are passed from the source of alternating current to an energizing means of the motor to effect a stroke thereof in one direction, the frequency of the strokes being a function of, but different from the frequency of the alternating current.

Another object of my invention is to provide a reciprocating motor embodying multiple-pole actuating elements.

Another object of my invention is to transfer the connections between an electric circuit and several windings of a translating device during intervals of zero current value.

These and other objects of my invention will be readily comprehended from a consideration of the accompanying specification and drawings.

In controlling the energization of a reciprocating motor comprising two windings that operate alternately upon a movable core member, it is desirable to interrupt the circuit of each winding alternately or to transmit energy impulses to the respective windings alternately. If the circuits of the windings are to be interrupted, they should be interrupted during zero current values. Interruption of the circuits at any other time involves arcing between the separating contact surfaces and their gradual deterioration.

By reason of the inductive nature of the windings and the variation of the inductance of the winding circuit caused by the moving core of the motor, it is essential to provide a current controlling device which is unaffected by such variations and which will interrupt the circuit at zero current values to obviate arcing.

In accordance with the principle of my invention, I employ an electric valve, such as a vacuum valve, having such characteristics as to transmit only current having a predetermined polarity in cooperation with a synchronous switch to control the energization of the windings of a reciprocating motor. The switch alternately maintains the circuit connection of each winding for the duration of a complete current wave or impulse.

In order to procure a long powerful stroke, I construct the actuating elements of the motor of a plurality of cumulatively effective windings. Two electric valves are provided to translate the waves of an alternating current derived from a single phase source into waves of the same polarity. A synchronous switching device, such as a synchronous motor-driven switch, connects the respective windings of the actuating elements in succession, to the circuit, through the rectifiers, to permit the windings to be energized by a train of overlapping waves of one polarity.

The switching device selectively connects the circuit to the winding which is to be energized and the valve selectively transmits predetermined current waves. The switching device is so designed as to effect the switching operation during an interval of zero current.

Since the windings of the actuating elements of the present motor are cumulatively effective, the overlapping force impulses constitute large energy impulses of relatively long duration which control the actuation of the movable member of the motor accordingly. Operation of this nature renders the motor suitable for metal working such as riveting, that requires a long powerful stroke.

In the accompanying drawings, Figure 1 is a sectional view, taken longitudinally, of an electric hammer to be controlled in accordance with my invention;

Figure 2 is a diagrammatic view of a simple system for controlling the motor illustrated in Fig. 1;

Figure 3 is an oscillogram of a rectified current derived from a single phase alternating current to energize the motor shown in Fig. 1;

Figure 4 is a diagrammatic view of a modified system for controlling a hammer of the type shown in Fig. 1;

Figure 5 is an oscillogram of a rectified current derived from a single-phase alternating current to energize the hammer shown in Fig. 4;

Figure 6 is a diagrammatic view of a system containing a reciprocating motor of modified form controlled in accordance with my invention;

Figure 7 is an elevational view of a synchronous switching device to control the circuits of the windings of the motor shown in Fig. 6;

Figure 8 is a schematic view of a hammer embodying three windings in each solenoid;

Figure 9 is an elevational view of a synchronous switching device to control the circuits of the windings of the motor shown in Fig. 8; and Figure 10 is an oscillogram illustrating the manner in which the rectified current waves derived from an alternating current are supplied to the windings of the multiple-pole reciprocating hammer illustrated in Fig. 8.

In applying a reciprocating motor, particularly of the percussive-tool type, in metal working, and under analogous circumstances requiring low frequency operation, the conditions encountered are different from those encountered in stone working, such as drilling and chipping, for which a high frequency motor hammer is adaptable. Metal working requires a long powerful stroke. To obtain such a stroke in a reciprocating hammer energized from a commercial circuit is an object of my invention.

In order to obtain a stroke of long duration, which is, in effect, a reduction of the speed or frequency or operation of the motor hammer, I compose the actuating elements or selonoids of the hammer of a plurality of pole windings. Since a plurality of current waves are alternately utilized to energize the windings of the two solenoids, the speed of the movable element or core operating between the solenoids is reduced accordingly, relative to the frequency of the system.

As illustrated in Fig. 2, energy is derived from an alternating current circuit 10 and supplied to a hammer 11 of the reciprocating motor type through an asymmetric valve or rectifier 12, such as a two-element bulb, and a switching device 13 controlled by a synchronous motor 14, connected to circuit 10.

The rectifier bulb 12 comprises a cathode or electron emitting body as a filament 15, and a plate or anode 16. The filament is heated by current derived through a transformer 17.

The hammer 11, as illustrated in Fig. 1, comprises two solenoids 18 and 19, and a core member 20 reciprocated by the solenoids to strike shank $t$ of a suitable tool G, such as a drill; to vibrate a sieve; or, in general, to do useful work. Associated with the winding 18 are the pole tips 1 and 2, of annular series of groups of laminæ, between which is formed an air gap bridged by the core 20 in its movement. Similarly, between the pole tips 3 and 4 is formed a second air gap in the field energized by the winding 19. The two air gaps are spaced longitudinally from each other in the direction of travel of the core 20. The structure may be enclosed within the casing 5, generally of magnetic material, and the motor or hammer is provided with a handle 6 in which is housed a control switch operable by the trigger or lever 7.

The switching device 13 periodically connects the rectifier anode 16 to a terminal of each of the solenoids 18 and 19 to energize them, alternately; that is, switch 13 effects periodic transfer of windings 18 and 19 to the circuit of the rectifier, such as 12. The switch device 13 comprises two sets of stationary contact members 22 and 23 engaged by a contacting segment 24 of conducting material mounted on a drum driven by the synchronous motor connected to circuit 10.

In the oscillogram in Fig. 3 curve V and curves C represent, respectively, the impressed voltage and the rectified current impulses produced by the rectifier 12 from the alternating current derived from the circuit 10. The waves C shown may be considered, for the sake of identification, the positive waves. Those waves are transmitted by the valve 12 and the negative waves of the alternating current are suppressed. The elimination of the negative waves involves extended intervals of zero current value between the successive positive waves.

It will be observed from the oscillogram of Fig. 3 that the transmitted current waves C are of a duration exceeding 180 electrical degrees and more nearly of the order of 275 electrical degrees, due to the effects of the inductance of the solenoids.

Since the prolonged intervals of zero current between the successive positive current waves, corresponds to about 85 electrical degrees, the circuits of the windings may be opened and closed during those intervals without drawing an arc and causing pitting of the contacts of the switching device.

By constructing the contacting segment 24 of such length as to correspond to about 290 or 300 electrical degrees the respective circuits of the windings 18 and 19 will be closed and opened during intervals of zero current, and all arcing obviated. It will be necessary to provide such driving mechanism, between the motor and the drum or disc carrying the contacting segment as to effect one rotation of the disc in an interval corresponding to 720 electrical degrees.

With the arrangement illustrated in Fig. 2, each winding is alternately connected to the valve to be energized from the circuit, by alternate positive current waves. The closure and interruption of the circuit between each winding and the valve is effected during an interval of zero current or period of low or zero conducitivity of the valve, and there is therefore no arcing between the contact members and the contacting segment. Since alternate positive current waves are supplied to the respective hammer windings, the frequency of operation of the hammer is 1800 strokes per minute for a 60 cycle circuit.

In Fig. 4 is illustrated a system not itself herein claimed, in which both waves of the current are used and synchronous operation of the hammer effected. Two valves 12 and 25 are employed. The plate of valve 12 is connected to one terminal of winding 18, the other terminal of which is connected to conductor 26 of the circuit 10. The plate of valve 25 is connected to one terminal of winding 19, the other terminal of which is connected to conductor 27 of circuit 10.

When conductor 26 is positive relative to conductor 27, valve 12 transmits the positive wave, illustrated in solid line b in Fig. 5, to energize the winding 18, but valve 25 transmits no current to winding 19. The core is then drawn forward by the winding 18.

When the conductor 27 is positive relative to conductor 26, valve 25 transmits the negative current wave, illustrated in dotted line a in Fig. 5, to energize winding 19, but valve 12 transmits no current to winding 18. The core 20 is thereupon drawn backward by winding 19.

The core is thus reciprocated in synchronism with the alternating current of circuit 10 and if directed to strike a properly disposed tool, may be caused to do useful work. The core, in this system, makes 3600 strokes per minute when energized from a 60 cycle circuit.

In such a system, as illustrated in Fig. 4, where all available current energy is utilized, the speed obtained is too high for the application desired.

In order to obtain a lower speed, I modify the hammer illustrated in Figs. 2 and 4, and compose each of the respective solenoids 18 and 19 of two windings 30, 31, and 32, 33, as illustrated in Fig. 6. Switch contacts 34 are disposed between the anode of valve 12 and one terminal of winding 30, and contacts 35 between valve 12 and winding 32. Similarly, contacts 36 are disposed between the anode of valve 25 and winding 31, and contacts 37 between valve 25 and winding 33. The other terminals of windings 30 and 32 are joined and connected to conductor 26 and the other terminals of windings 31 and 33 are joined and connected to conductor 27 of circuit 10.

The switch contacts 34, 35, 36 and 37 are controlled by suitable means such as a drum or disc 38, Fig. 7, driven by a synchronous motor 14. The speed of the drum or disc is regulated to rotate once in an interval corresponding to the time interval of four complete cycles of the circuit 10.

As illustrated in Fig. 5, the negative waves are rectified so that all waves are of one polarity when two valves are used. If now the valves are connected to the solenoid windings at the proper time, each solenoid may be energized by a group of energy impulses consisting of both current waves of a cycle, the positive and the rectified negative wave.

I therefore provide on the drum 38, two switch-controlling segments 39 and 40 of such length relative to the size of the drum as to correspond to about 290 electrical degrees. The segments are so disposed relative to each other that their middle points are angularly displaced 180 electrical degrees.

The segments may be of conducting material and bridge the switch contacts or they may be of insulating material and arranged to effect engagement of the associated switch contacts. This detail is merely a matter of design. The segments and the switch contacts should be so disposed that the segments will engage and disengage the associated switch contacts during the zero current intervals.

Switch contacts 34 and 35 are spaced 720 electrical degrees and the switch contacts 36 and 37 are disposed intermediate them, as illustrated in Fig. 7.

Assuming the direction of rotation of the drum to be clockwise, the segment 39 will close switch contacts 37 and connect valve 25 to winding 33 to transmit current wave a in Fig. 5 to energize winding 33. Shortly after current wave a attains its maximum value, corresponding to the mid point of segment 39, the segment 40 closes switch contacts 35 to connect valve 12 to winding 32 to transmit current wave b to energize winding 32.

Upon reference to Fig. 5, it will be apparent that by reason of the overlapping of current waves a and b, transmitted to the windings 32 and 33, the composite solenoid 19 comprising those windings develops a single force impulse that exists for an interval corresponding to the length of the base line covered by both current waves $a$ and $b$. The energy transmitted to the solenoid 19 to be used in actuating the core 20 is proportional to the total area of both current waves $a$ and $b$.

After the segment 40 closes the switch contacts 35 to transmit current wave $b$, current wave $a$ decreases to zero value and shortly thereafter segment 39 opens switch contacts 37 to disconnect winding 33. Segment 40, however, maintains contacts 35 closed until current wave $b$ decreases to zero value. Switch contacts 35 are then opened to disconnect winding 32.

When the drum 38 that is illustrated in Fig. 7, is employed, the next succeeding current waves $c$ and $d$, comprising the subsequent cycle, are not utilized. During the interval of zero current value between waves $c$ and $e$ however, segment 39' closes switch contacts 36 connecting valve 25 to winding 31. That winding is then energized by current wave $e$. Similarly, segment 40 closes contacts 34 to transmit current wave $f$ to winding 30 through valve 12 before contacts 36 are opened.

Windings 30 and 31 constituting composite solenoid 18 are thus energized by current waves $e$ and $f$ to actuate the core 20 toward the left hand or forward direction.

As the drum 38 continues to rotate, the energy of the alternate cycles is alternately supplied to the solenoids 18 and 19 to reciprocate the core 20. The core will be actuated to make 900 strokes per minute when the hammer is energized from a 60 cycle circuit.

By modifying the structure of the drum 38, all available current energy may be utilized. Assume the speed of the drum to be reduced to half its previous speed, so that one rotation will be made in an interval corresponding to the time of two cycles of the circuit current. By increasing the lengths of the segments 39 and 40, respectively, to still subtend an angle of 290 electrical degrees, with their mid points angularly displaced 180 electrical degrees, the contact switches will be closed at such intervals as to transmit the energy of the successive cycles alternately to the solenoids 18 and 19. All available energy will be thus utilized and the core 20 will be operated to make 1800 strokes per minute.

In a system in which all available current energy is utilized, the formula $$f = r, p$$

applies to the reciprocating motor just as it does to the rotating machine. In the above formula $f$ = frequency.
$r$ = revolutions per sec. or strokes per sec.
$p$ = pairs of poles.

Thus the number of strokes per unit of time may be controlled, for any predetermined frequency by providing the proper number of poles. To obtain an operating speed of 1200 strokes per minute, which is equal to 20 strokes per second, from a 60 cycle circuit, three pair of poles must be provided, according to the formula $f = r\, p$, in which, by substitution, $60 = 20\, p$ or $p = 3$.

In Fig. 8, I have illustrated schematically a reciprocating motor provided with three pair of poles. The respective composite solenoids 18 and 19 comprises three windings which are connected to the two valves, at the proper intervals, to be energized by three successive current waves. Each movement or stroke of the core is effected by the energy impulse derived from a group of three overlapping current waves.

The solenoid 18 comprises three windings 51, 52 and 53, respectively. The solenoid 19 comprises three windings 54, 55 and 56, respectively.

To control the reciprocating motor illustrated in Fig. 8, a drum 60, Fig. 9, similar to drum 38 of Fig. 7, is provided with two contact controlling segments 61 and 62 to control six contact switches 64, 65, 66, 67, 68 and 69, respectively.

The segment 61 controls switches 64, 66 and 68 in sequence and segment 62 controls switches 65, 67 and 69 in sequence. Switches 64, 66 and 68 connect windings 53, 51 and 55, respectively, to the valve 12. Switches 65, 67 and 69 connect windings 52, 54 and 56 to the valve 25.

The segments respectively subtend an angle of about 290 electrical degrees and are displaced 180 electrical degrees. With the arrangement that is illustrated in Fig. 9, one rotation of the drum should correspond to three cycles or 1080 electrical degrees.

Upon referring to Figs. 8, 9 and 10, it will be seen that switches 64 and 65 will be closed for proper intervals to transmit current waves $u$ and $v$ to windings 53 and 52, respectively, and then switch 66 is closed to transmit current wave $w$ to winding 51. The three current waves $u$, $v$ and $w$, by reason of their successive overlapping, will produce a single force prolonged impulse summing the energy of the group of the three current waves and enduring for an interval corresponding to the length of the base line between the outer zero points of the terminal waves $u$ and $w$.

The magnetic force developed by the group of current waves in the three windings 51, 52 and 53 impresses an actuating force on the core to move it in the direction of the solenoid 18 comprising the windings, 51, 52 and 53.

Just before the switch 66 is opened to deenergize the third winding of the solenoid, switch 67 is closed by segment 62 to connect winding 54 in circuit with the valve 25 and transmit wave $x$. Before switch 67 is opened, switch 68 is closed, and, subsequently, switch 69 is closed. The three windings 54, 55 and 56 are respectively energized by current waves $x$, $y$ and $z$, and impress a combined force upon the core in the direction of the solenoid 19.

As the drum 60 continues to rotate, the proper switches are closed in sequence, and for proper intervals, to transmit successive current waves to the respective windings of the two solenoids to produce operating forces of relatively large magnitude and long duration. The core is thus reciprocated by the large impulse forces that operate for relatively long intervals.

The actuating impulse forces, which constitute a group of current impulses, are less in number per unit of time than the number of current waves traversing the circuit in the same unit of time.

The construction of the drum may be variously modified to obtain similar periodic operation of the switches to control their associated circuits.

My invention therefore comprehends a method of and means for switching electric circuits, especially of an inductive character, during intervals when the circuit current is zero.

My invention further comprehends a novel motor of the reciprocating type and a method of and means for controlling the operation of the motor to render it suitable for use as a percussive tool operating at relatively low frequency.

My invention has further application in lamp flashing systems in which the lamp or lamps may be lighted and darkened for definite intervals of time, and the circuits opened and closed at instants of zero current value.

Changes and modifications may be made in the arrangements of the several elements entering into the combination operating in accordance with my invention, without departing from the spirit and scope of my invention as set forth in the appended claims.

I claim as my invention—

1. An electric tool adapted for operation by energy from a single phase circuit, comprising two field producing elements, each consisting of two windings, a movable striker element controlled thereby to do work, two asymmetric valves to be severally connected to the respective conductors of the single phase circuit to transmit current to corresponding windings of the field producing elements and switching means for selectively connecting the valves to the windings.

2. An electric tool adapted for operation by energy from a single phase circuit, comprising two field producing elements, each consisting of two windings, a movable striker element controlled thereby to do work, two asymmetric valves to be severally connected to the respective conductors of the single phase circuit to transmit current to corresponding windings of the field producing elements and switching means for controlling the connection of the valves to the windings, said means comprising a motor driven drum provided with conducting segments and contact members to be engaged thereby to complete the circuits between the valves and the windings, the conducting segments being of such length and so disposed relative to each other as to complete in succession, the circuits between the valves and the respective windings throughout the complete interval during which a current wave is transmitted to the respective windings through the associated valves.

3. In combination, a reciprocating motor comprising two solenoids each consisting of two windings, two rectifiers, connecting means between a terminal of each rectifier and one winding of each solenoid, and a switching device for controlling the connecting means.

4. In combination, a reciprocating motor comprising two solenoids each consisting of two windings, two rectifiers, connecting means between a terminal of each rectifier and one winding of each solenoid, and a sequential switching device for controlling the connections betweeen the rectifiers and the windings.

5. The combination with a source of alternating current and a reciprocating motor comprising a plurality of field-producing windings and a magnetic member actuated thereby, of means for passing through said windings from said source current impulses initiated by different half cycles of electromotive-force of said source for actuating said magnetic member in one direction, and means for returning said member in opposite direction.

6. The combination with a source of alternating current and a reciprocating motor comprising a plurality of field-producing windings and a magnetic member actuated thereby, of means for passing through said windings from said source overlapping current impulses initiated by immediately successive positive and negative half cycles of electro-motive-force of said source for actuating said magnetic member in one direction, and means for returning said member in opposite direction.

7. The combination with a source of alternating current and a reciprocating motor comprising a plurality of field-producing windings and a magnetic member actuated thereby, of an electric valve in circuit with said source and each of said windings for effecting therein dephased current impulses for actuating said magnetic member in one direction, means for returning said magnetic member in opposite direction, and periodically operating switching mechanism for periodically connecting and disconnecting said valves to and from said windings.

8. The combination with a source of alternating current and a reciprocating motor comprising a plurality of field-producing windings and a magnetic member actuated thereby, of an electric valve for each of said windings, periodically operating switching mechanism for periodically closing circuit of said windings through their respective valves to said source for causing dephased impulses in said windings to actuate said magnetic member in one direction, and means for returning said magnetic member in opposite direction while said switching mechanism is in position opening the circuits of said windings.

9. The combination with a source of alternating current and a reciprocating motor comprising a plurality of field-producing windings and a magnetic member actuated thereby, of an electric valve for each of said windings, periodically operating switching mechanism for periodically closing circuit of said windings through their respective valves to said source for causing dephased impulses in said windings to actuate said magnetic member in one direction, and means for returning said magnetic member in opposite direction while said switching mechanism is in position opening the circuits of said windings, said switching mechanism being so timed in its operation that the circuits of said windings are opened during periods of substantially zero conductivity of said valves.

10. The combination with a source of alternating current and a reciprocating motor comprising a plurality of windings and a magnetic member reciprocated thereby, of means for selecting uni-directional current impulses from said source, and switching mechanism energized from said source passing the selected impulses alternately through said windings for actuating said magnetic member in opposite directions at a frequency dependent on the speed of said switching mechanism and the frequency of said alternating source.

11. The combination with a source of alternating current and a reciprocating motor comprising a plurality of windings and a magnetic member actuated thereby, of means for selecting uni-directional current impulses from said source, periodic switching mechanism passing the selected impulses alternately through said windings for actuating said magnetic member in one direction, and means for returning said magnetic member in opposite direction.

12. The combination with a source of alternating current and a reciprocating motor comprising a plurality of field-producing windings and a magnetic member actuated thereby, of an electric valve in circuit with said source and each of said windings for effecting therein dephased current impulses for actuating said magnetic member in one direction, and a winding energized through one of said valves for returning said magnetic member in opposite direction.

13. The combination with a source of alternating current and a reciprocating motor comprising a plurality of field-producing windings and a magnetic member actuated thereby, of an electric valve in circuit with said source and each of said windings for effecting therein dephased current impulses for actuating said magnetic member in one direction, and a plurality of windings energized, respectively, through said valves for actuating said magnetic member in opposite direction.

14. The combination with a source of alternating current and a reciprocating motor comprising a plurality of field-producing windings and a magnetic member actuated thereby, of an electric valve in circuit with said source and each of said windings for effecting therein dephased current impulses for actuating said magnetic member in one direction, a plurality of windings energized, respectively, through said valves for actuating said magnetic member in opposite direction, and periodically operating switching mechanism for transferring said valves from one of said groups of windings to the other.

15. In a system comprising an alternating current source, a reciprocating motor having field-producing means and a reciprocating core element, a synchronous switch, and asymmetrical conductors for passing uni-directional current impulses from said source through the switch to said field-producing means, the method of operation which comprises passing a plurality of dephased uni-directional current impulses from said source to said field-producing means to effect a stroke of said reciprocating element in one direction, and moving said element in opposite direction.

16. In a system comprising an alternating current source, a reciprocating motor having winding structure and a reciprocating core element, a synchronous switch, and asymmetrical conductors for passing uni-directional current impulses from said source through the switch to said winding structure, the method of operation which comprises passing a plurality of dephased uni-directional current impulses from said source to one part of said winding structure to effect a stroke of said reciprocating element in one direction, and subsequently passing a plurality of dephased uni-directional current impulses from said source to another part of said winding structure for effecting movement of said element in opposite direction.

17. In a system comprising a source of alternating current, a reciprocating motor having field-producing structure and a reciprocating core element, asymmetrical conductors, and a synchronous switch coacting with said asymmetrical conductors for passing current impulses to the motor, the method of operation which comprises switching a plurality of dephased uni-directional current impulses from said source through said field-producing structure to effect a stroke of said core element, and thereafter effecting a return stroke of said core element.

18. The combination with a source of alternating current, of a reciprocating motor having field-producing structure and a reciprocating core element, asymmetrical conductors for passing uni-directional current impulses from said alternating current source, synchronous switching means coacting therewith for selecting a plurality of said impulses and directing the same through said field-producing structure for actuating said core in one direction, and means for actuating said core in opposite direction.

19. The combination with a source of alternating current, of a reciprocating motor having field-producing structure and a reciprocating core element, asymmetrical conductors for passing uni-directional current impulses from said source, means controlled from said alternating current source for selecting a plurality of said uni-directional current impulses and directing the same through said field-producing means for actuating said core in one direction, and means for actuating said core in opposite direction.

20. The method of operating a reciprocating motor from an alternating current source which comprises selecting a plurality of dephased uni-directional current impulses from said source, passing said impulses through energizing structure of said motor to effect a stroke of said motor in one direction, and producing a return stroke in the opposite direction, the frequency of said strokes being a function of but different from the frequency of said alternating current.

21. The method of operating a reciprocating motor from an alternating current source, which comprises selecting a plurality of dephased uni-directional current impulses from said source, passing said impulses through an energizing portion of said motor to effect a stroke thereof in one direction, and subsequently selecting and passing a predetermined number of said impulses to another energizing portion of said motor to effect a stroke in the opposite direction, the frequency of said strokes being a function of but different from the frequency of said alternating current source.

22. The combination with a source of alternating current, of a plurality of translating devices, means for connecting said translating devices alternately in circuit with said source, and means controlled solely by said source of alternating current for passing through each translating device while in connection with said source a composite unidirectional current impulse comprising dephased rectified components of current from said source.

23. The combination with an alternating current source, an asymmetrical conductor connected thereto, and a translating device having a plurality of field-producing windings, of means for energizing said windings in sequence from said source comprising circuit controlling means actuated by current from said source and adapted to establish alternate electrical connections between said windings and said asymmetrical conductor at a rate which is a function of the frequency of said source.

24. The combination with an alternating current source, an asymmetrical conductor connected thereto, a translating device having a plurality of field-producing windings, and a movable core, of means for energizing said windings in sequence from said source to affect movements of said core in opposite directions comprising circuit controlling means actuated by current from said source and adapted to establish alternate electrical connections between said windings and said asymmetrical conductor at a rate which is a function of the frequency of said source.

25. In the operation of a system comprising an alternating current source, a reciprocating motor having field-producing structure, switching means and a plurality of asymmetrical conductors connected between said source and motor, the method of operation which comprises establishing a conductive path through said field-producing structure, switching means and one of said asymmetrical conductors, and subsequently establishing a conductive path through said structure, switching means and another of said asymmetrical conductors to produce reciprocation of said motor at a rate which is a function of but different from the frequency of said alternating current.

In testimony whereof I hereunto affix my signature this 13th day of February, 1924.

CARL S. WEYANDT.